US009077910B2

(12) United States Patent
Ninan et al.

(10) Patent No.: US 9,077,910 B2
(45) Date of Patent: Jul. 7, 2015

(54) MULTI-FIELD CCD CAPTURE FOR HDR IMAGING

(75) Inventors: Ajit Ninan, San Jose, CA (US); Gregory John Ward, Berkeley, CA (US); Qifan Huang, Foster City, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 167 days.

(21) Appl. No.: 13/440,902

(22) Filed: Apr. 5, 2012

(65) Prior Publication Data

US 2012/0257079 A1 Oct. 11, 2012

Related U.S. Application Data

(60) Provisional application No. 61/472,495, filed on Apr. 6, 2011.

(51) Int. Cl.

| | |
|---|---|
| ***H04N 5/235*** | (2006.01) |
| ***H04N 5/345*** | (2011.01) |
| ***H04N 9/04*** | (2006.01) |

(52) U.S. Cl.

CPC ........... *H04N 5/2355* (2013.01); *H04N 5/3456* (2013.01); *H04N 9/045* (2013.01)

(58) Field of Classification Search

CPC ..... H04N 1/3871; H04N 1/407; H04N 5/235; H04N 5/23229; H04N 13/02; H04N 13/0282; H04N 5/2355; H04N 5/335; G06T 2207/20208; G06T 5/009; G06T 5/40; G06T 5/007

USPC ........................... 348/222.1–230.1, 362–367

See application file for complete search history.

(56) References Cited

U.S. PATENT DOCUMENTS

| | | | |
|---|---|---|---|
| 3,982,274 | A | 9/1976 | Chai |
| 4,064,532 | A | 12/1977 | Yamanaka |

(Continued)

FOREIGN PATENT DOCUMENTS

| | | |
|---|---|---|
| CN | 101360192 | 2/2009 |
| EP | 1422660 | 5/2004 |

(Continued)

OTHER PUBLICATIONS

Feng, G., et al., "Wide Field of View CCD Camera Based on Multi-Sensors Image Mosaics" published Jan. 2008, vol. 2, Congress on Image and Signal Processing.

(Continued)

*Primary Examiner* — Pritham Prabhakher

(57) ABSTRACT

Techniques are described to combine image data from multiple images with different exposures into a relatively high dynamic range image. A first image of a scene may be generated with a first operational mode of an image processing system. A second image of the scene may be generated with a second different operational mode of the image processing system. The first image may be of a first spatial resolution, while the second image may be of a second spatial resolution. For example, the first spatial resolution may be higher than the second spatial resolution. The first image and the second image may be combined into an output image of the scene. The output image may be of a higher dynamic range than either of the first image and the second image and may be of a spatial resolution higher than the second spatial resolution.

25 Claims, 12 Drawing Sheets generate first measurable imagery responses of a scene, the first measurable imagery responses being obtained by exposing a first field of a multi-field image sensor of an image processing system for a first time duration 412 generate second measurable imagery responses of the scene, the second measurable imagery responses at least in part being obtained by exposing a second field of the multi-field image sensor of the image processing system for a second time duration that contains the first time duration 414 convert the first measurable imagery responses and the second measurable imagery responses into at least a part of an output image of the scene 416

(56) References Cited

U.S. PATENT DOCUMENTS

| | | | | |
|---|---|---|---|---|
| 6,646,246 | B1 | 11/2003 | Gindele | |
| 7,003,177 | B1 | 2/2006 | Mendlovic | |
| 7,084,905 | B1 | 8/2006 | Nayar | |
| 7,239,805 | B2 | 7/2007 | Uyttendaele | |
| 7,295,241 | B2 | 11/2007 | Sugimoto | |
| 7,352,398 | B2 | 4/2008 | Sano | |
| 7,382,931 | B2 | 6/2008 | Kang | |
| 7,440,011 | B2 | 10/2008 | Fleury | |
| 7,479,998 | B2 | 1/2009 | Mitsunaga | |
| 7,616,354 | B2 | 11/2009 | Kobayashi | |
| 7,626,614 | B1 | 12/2009 | Marcu | |
| 7,636,115 | B2 | 12/2009 | Hong | |
| 7,782,393 | B2 | 8/2010 | Ward | |
| 8,339,475 | B2 * | 12/2012 | Atanassov et al. | 348/229.1 |
| 8,629,927 | B2 * | 1/2014 | Bechtel et al. | 348/302 |
| 8,749,694 | B2 * | 6/2014 | Georgiev et al. | 348/345 |
| 2004/0008267 | A1 | 1/2004 | Chen | |
| 2006/0209204 | A1 * | 9/2006 | Ward | 348/362 |
| 2007/0194121 | A1 | 8/2007 | Yang | |
| 2008/0149812 | A1 | 6/2008 | Ward | |
| 2008/0174686 | A1 | 7/2008 | Tanaka | |
| 2008/0198235 | A1 | 8/2008 | Chen | |
| 2009/0046947 | A1 | 2/2009 | Kobayashi | |
| 2009/0073274 | A1 | 3/2009 | Dai | |
| 2009/0091645 | A1 * | 4/2009 | Trimeche et al. | 348/273 |
| 2009/0160987 | A1 * | 6/2009 | Bechtel et al. | 348/302 |
| 2009/0309998 | A1 * | 12/2009 | Grosvenor et al. | 348/241 |
| 2010/0128137 | A1 * | 5/2010 | Guidash | 348/222.1 |
| 2010/0128779 | A1 * | 5/2010 | Chatterjee et al. | 375/240.12 |
| 2010/0134662 | A1 | 6/2010 | Bub | |
| 2010/0157078 | A1 * | 6/2010 | Atanassov et al. | 348/222.1 |
| 2010/0182477 | A1 | 7/2010 | Yonemoto | |
| 2010/0225783 | A1 | 9/2010 | Wagner | |
| 2010/0245635 | A1 | 9/2010 | Lin | |
| 2011/0063483 | A1 * | 3/2011 | Rossi et al. | 348/294 |
| 2011/0090365 | A1 * | 4/2011 | Cha et al. | 348/229.1 |
| 2012/0025080 | A1 * | 2/2012 | Liu et al. | 250/332 |
| 2012/0162457 | A1 * | 6/2012 | Veeraraghavan et al. | 348/222.1 |

FOREIGN PATENT DOCUMENTS

| | | |
|---|---|---|
| JP | 3117281 | 5/1991 |
| JP | 7254966 | 10/1995 |
| JP | 8251604 | 9/1996 |
| JP | 2003-018455 | 1/2003 |
| JP | 2005-151217 | 6/2005 |
| JP | 2005-167832 | 6/2005 |
| JP | 2005-303653 | 10/2005 |
| JP | 2006-148494 | 6/2006 |
| JP | 2006-191449 | 7/2006 |
| JP | 2007-036332 | 2/2007 |
| JP | 2008-236726 | 10/2008 |
| KR | 2007-119147 | 12/2007 |

OTHER PUBLICATIONS

Coutinho, R.C., et al., “High-Dynamic-Range Imaging Optical Detectors” Proceedings of the SPIE—The International Society for Optical Engineering, vol. 4735, pp. 41-50, published 2002.

Zhao, Z., et al., “High-speed CCD Camera at NAOC” Proceedings of the SPIE—The International Society for Optical Engineering, vol. 6276, pp. 62760E-1-7, published in 2006.

Robertson, Mark A., et al., “Estimation-Theoretic Approach to Dynamic Range Enhancement Using Multiple Exposures” Journal of Electronic Imaging published in May 2003, published by SPIE.

Florin, T., et al., “Simulation the Functionality of a Web Cam Image Capture System” WSEAS Transactions on Circuits and Systems, vol. 8, No. 10, pp. 811-821, published in Oct. 2009.

Raanes, C.A., et al., “A High Resolution CCD Camera Family with a PC Host” Proceedings of the SPIE—The International Society for Optical Engineering, vol. 1901, pp. 64-68, published in 1993.

Anders, Astrom, et al., “High-Speed and High-Dynamic Range Difference Imaging Based on the Near-Sensor Image Processing Concept” Proceedings-SPIE the International Society for Optical Engineering, 2009, vol. 7249.

* cited by examiner generate a first image of a scene with a first operational mode of an image processing system 402 generate a second image of the scene with a second different operational mode of the image processing system, the first image being of a first spatial resolution 404 combine the first image and the second image into an output image of the scene 406

FIG. 4A generate first measurable imagery responses of a scene, the first measurable imagery responses being obtained by exposing a first field of a multi-field image sensor of an image processing system for a first time duration 412 generate second measurable imagery responses of the scene, the second measurable imagery responses at least in part being obtained by exposing a second field of the multi-field image sensor of the image processing system for a second time duration that contains the first time duration 414 convert the first measurable imagery responses and the second measurable imagery responses into at least a part of an output image of the scene 416

FIG. 4B receive a first image of a scene, the first image having a first dynamic range 422 receive a second image of the scene, the second image having a second different dynamic range 424 predict, based at least in part on the second image, one or more pixel values of the first image for a component color 426 generate, based at least in part on the first image and the one or more pixel values predicted based at least in part on the second image, an output image of the scene 428

FIG. 4C

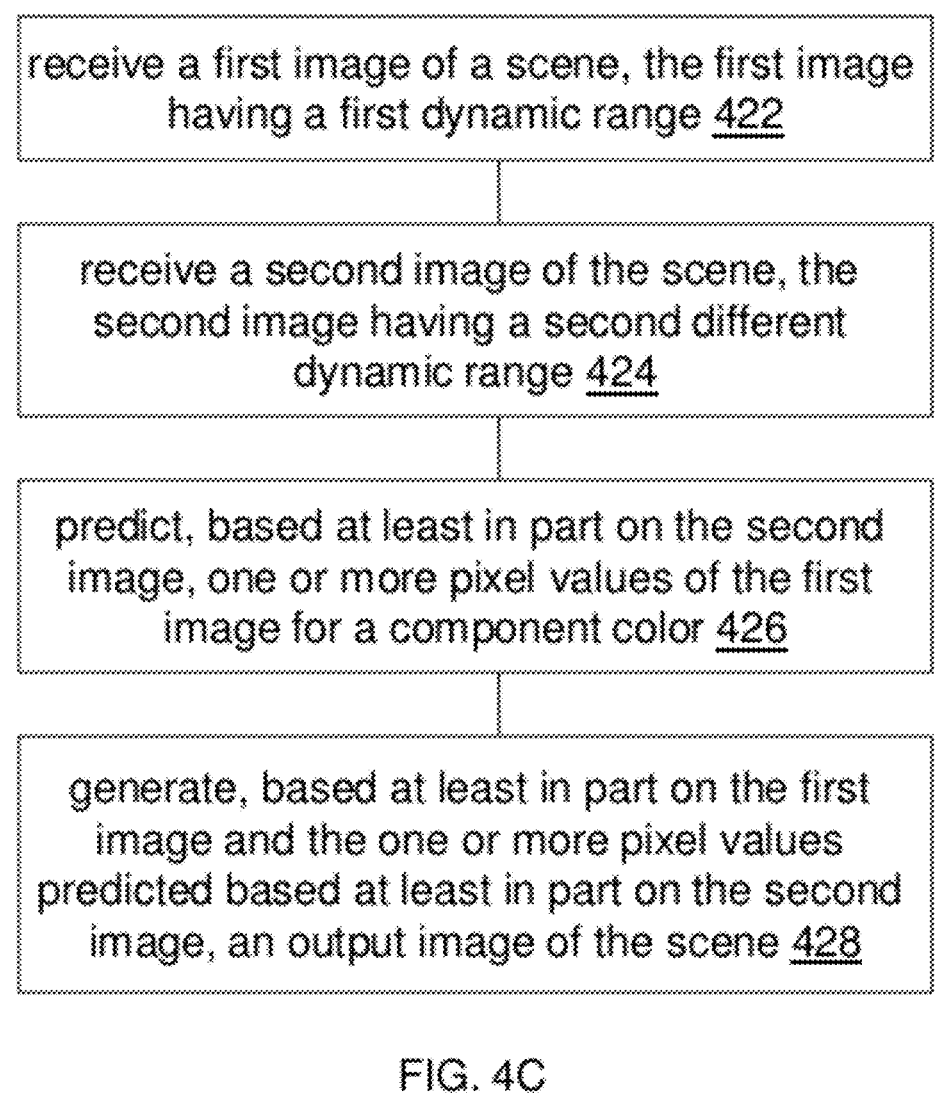

MULTI-FIELD CCD CAPTURE FOR HDR IMAGING

CROSS-REFERENCE TO RELATED APPLICATIONS

This application claims priority to U.S. Provisional Patent Application No. 61/472,495 filed Apr. 6, 2011, which is hereby incorporated by reference for all purposes.

TECHNOLOGY

The present invention relates generally to image generation, and in particular, to generating high dynamic range images.

BACKGROUND

Real world scenes may have contrast ratios of as much as 50,000:1 between the brightest highlights and the darkest shadows. Many existing image processing systems are only capable of reproducing contrast ratios of at most a few hundreds to one. Thus, many existing cameras are not capable of taking advantage of the fact that display systems may now be capable of supporting high dynamic range ("HDR") image formats and permitting rendering images of contrast ratios of a few thousands to one or better.

HDR is not yet widely supported because of the high costs associated with HDR image acquisition under existing approaches. For example, image sensors that are capable of producing discerning responses to a wide range of luminance levels are expensive to manufacture. Even if deployed at a high cost, a large volume of image data that would be generated, requiring expensive processing power to process the image data responsively. As a result, for small footprint devices such as consumer electronic devices, it would be neither economically feasible nor technically viable to support HDR image acquisition.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which:

FIG. 4A, FIG. 4B and FIG. 4C illustrate example process flows, according to a possible embodiment of the present invention.

DESCRIPTION OF EXAMPLE POSSIBLE EMBODIMENTS

Figure 1A:
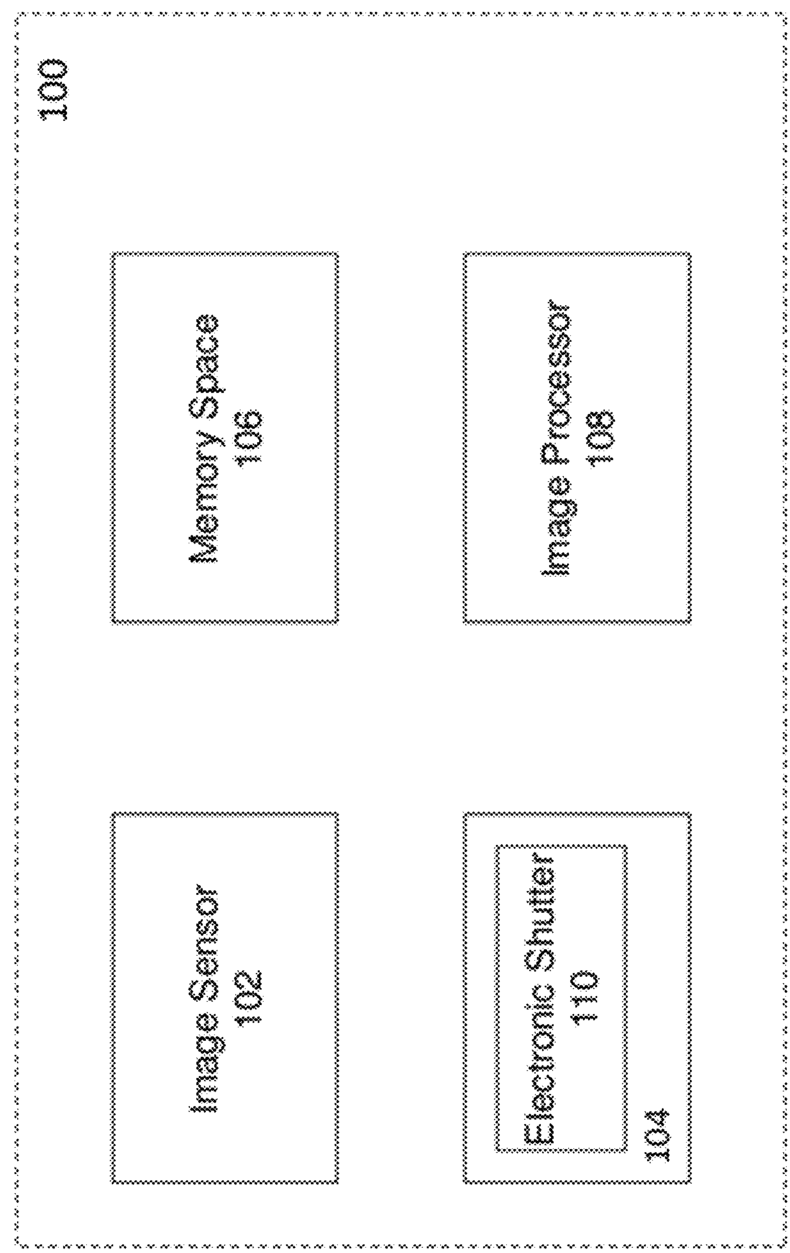
FIG. 1A illustrates an example image processing system, in accordance with some possible embodiments of the present invention.

Example possible embodiments, which relate to HDR image processing techniques, are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Example embodiments are described herein according to the following outline:

1. GENERAL OVERVIEW
2. IMAGE PROCESSING SYSTEM
3. LIGHT SENSITIVE AREA
4. OPERATIONS FOR CAPTURING MULTIPLE IMAGES
5. MIXED OPERATIONAL MODES FOR CAPTURING MULTIPLE IMAGES
6. MIXED OPERATIONAL MODES IN LIGHT SENSITIVE AREA
7. ADDITIONAL EXPOSURE TO COMPLEMENT MISSING COMPONENT COLOR
8. PREDICTING MISSING COMPONENT COLOR
9. EXAMPLE PROCESS FLOW
10. IMPLEMENTATION MECHANISMS—HARDWARE OVERVIEW
11. EQUIVALENTS, EXTENSIONS, ALTERNATIVES AND MISCELLANEOUS

1. General Overview

This overview presents a basic description of some aspects of a possible embodiment of the present invention. It should be noted that this overview is not an extensive or exhaustive summary of aspects of the possible embodiment. Moreover, it should be noted that this overview is not intended to be understood as identifying any particularly significant aspects or elements of the possible embodiment, nor as delineating any scope of the possible embodiment in particular, nor the invention in general. This overview merely presents some concepts that relate to the example possible embodiment in a condensed and simplified format, and should be understood as merely a conceptual prelude to a more detailed description of example possible embodiments that follows below.

Under techniques as described herein, multiple images with different exposures may be captured back to back to create an HDR image. In some possible embodiments, an image sensor such as a charge-couple-device (CCD) type may be relatively slow to offload a full resolution image in a reasonable amount of time. As a result, it may be relatively difficult to merge multiple images of the same scene with such an image sensor. In some possible embodiments, techniques herein may be used to reduce the time of capturing multiple images with different exposures with the image sensor.

In some possible embodiments, one of the multiple images of the same scene may be set to, for example, an optimal exposure with a full resolution. This image may be used to capture either shadow area details (for example, with a relatively longer exposure) or bright area details (for example, with a relatively short exposure). In some possible embodiments, another of the multiple images may be set to a lower spatial resolution. This other image may be set to capture luminance levels expressed in bright areas if the image with the optimal exposure is set to capture the shadow area details. On the other hand, this other image may be set to capture luminance levels expressed in shadow areas if the image with the optimal exposure is set to capture the bright area details. In various possible embodiments, additional images may or may not be captured of the same scene for the purpose of combining into an HDR image.

In some possible embodiments, an alternate video mode such as a preview mode, a view finder mode, etc. may be used as the lower resolution mode mentioned above to capture low resolution images. Techniques herein may support switching between multiple operating modes from the full resolution to the lowest resolution modes. In some possible embodiments, a lower resolution image may be upsampled into a stack frame comprising the same number of pixels as the higher resolution image. In some possible embodiments, the upsampled lower resolution image and the higher resolution image may be merged to produce the HDR image comprising additional dynamic range luminance information.

In various possible embodiments, single-field, two-field, three-field, four-field, etc., image sensors may be used in an image processing system herein. One or more electronic shutter operations and/or mechanical shutter operations that transfer/shift measurable imagery responses from individual fields of the image sensors may be performed for the purpose of generating multiple images of the same scene in connection with the HDR image generation. In some possible embodiments, an image, which may be created with a first field of a multi-field image sensor, may be missing a component color in the full complement of a color space used by the image processing system. In some possible embodiments, a separate exposure may be made to transfer/shift measurable imagery responses from a second field of the image sensor. The responses from the second field may be combined with the responses in the first field to generate an image that comprises image data for the full complement of the color space.

In some possible embodiments, instead of taking a separate exposure to complement a missing component color in a first image, a second image with the full complement of a color space may be used to construct one or more histograms to predict pixel values (or portions of pixel values) for the missing component color in the first image. In some possible embodiments, two or more histograms, which may correspond to different segments of an image, may be used to predict pixel values for the missing component color in each of these different segments.

In some possible embodiments, mechanisms as described herein form a part of a display system, including but not limited to a television, a laptop computer, netbook computer, cellular radiotelephone, electronic book reader, point of sale terminal, desktop computer, computer workstation, computer kiosk, and various other kinds of terminals and display units.

Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

2. Image Processing System

FIG. 1A illustrates an example image processing system (100), in accordance with some possible embodiments of the present invention. In some possible embodiments, the image processing system (100) may be implemented by one or more computing devices and may be configured with software and/or hardware components that implement image processing techniques for generating a wide dynamic range image based on at least two relatively low dynamic range images.

In some possible embodiments, the system (100) may comprise an image sensor (102), which may comprise light sensitive (or photoactive) elements configured to generate measurable signal responses to amounts of light illuminated on the light sensitive elements. For the purpose of the present invention, the memory space (106) may be any software and/or hardware component configured to generate measurable imagery responses to the incoming light of scenes. In some possible embodiments, the image sensor may be of a charge coupled device (CCD) type. An example of measurable responses generated by light sensitive elements may be an electrical charge packet produced as a response to an amount of light illuminated on a light sensitive element of the image sensor (102). The system (100), or the image sensor (102) therein, may be configured with means such as electrodes that may be used to provide necessary (e.g., analog) waveforms to transfer electrical charge packets out of any of the light sensitive elements in the image sensor (102) to non-photoactive storage elements such as electric charge registers.

The system (100), or the image sensor (102) therein, may be configured with software and/or hardware components to sample/convert amounts of electric charges in electrical charge packets generated from the incoming light of the scene into digital signals. The system (100) may also be configured with software and/or hardware components to process the digital signals into pixel values that represent a part or whole of an image of the scene, and to store the pixel values in memory space (106) of the image processing system (100). For the purpose of the present invention, the memory space (106) may be any software and/or hardware component (e.g., RAM, flash memory, etc.) configured to support storing, retrieving, and manipulating operations of digital information such as pixel values.

The system (100) may comprise an image sensor controller (104) configured to operatively control the image sensor (102). For example, the image sensor controller (104) may comprise one or more of electronic, optical and/or mechanical components such as controllers, processors, sensors, flashes, lights, amplifiers, masks, mechanical shutter, one or more lenses, minors, etc., to set/regulate an exposure for capturing an image of the scene.

In some possible embodiments, the image sensor controller (104), or the image sensor (102), may comprise a mechanical shutter (not shown) configured to support optical and/or mechanical shutter operations. As used herein, an optical and/or mechanical shutter operation may refer to any operation that produces measurable imagery responses (e.g., electric charge packets, etc.) for a particular time duration from the image sensor (102), while blocking incoming light after the end of the particular time duration to reach light sensitive elements of the image sensor (102) at least for a second time duration.

In some possible embodiments, additionally and/or optionally, the image sensor controller (104), or the image sensor (102), may comprise an electronic shutter (110; as a part of the image sensor controller (104) for the purpose of illustration only) configured to support electronic shutter operations. As used herein, an electronic shutter operation may refer to any operation that transfers a part, or a whole, of measurable imagery responses (e.g., electric charge packets) for a particular time duration from the image sensor (102) to cache, registers, or temporary and/or permanent data stores while allowing the image sensor (102) to be (e.g., continually) exposed to incoming light of a scene after the end of the particular time duration to generate further measurable imagery responses from at least some light sensitive elements of the image sensor (102).

In some possible embodiments, additionally and/or optionally, the image sensor controller (104), or the image sensor (102), may comprise software and/or hardware configured to support image acquisition operations of various operational modes. Examples of operational modes may include, but are not limited to, still image mode, programmatically optimal mode, manual mode, video mode, preview mode, full resolution mode, partial mode, histogram mode, etc.

The system (100) may comprise an image processor (108) configured to access/receive/manipulate partial or whole images of a scene, and to process these partial or whole images of a scene into a relatively wide dynamic range image of the scene. In some possible embodiments, the partial or whole images of the scene may be produced by the image sensor (102) with one or more electronic shutter operations. In some possible embodiments, the partial or whole images of the scene may be produced by the image sensor (102) under different operational modes.

3. Light Sensitive Area

Figure 1B:
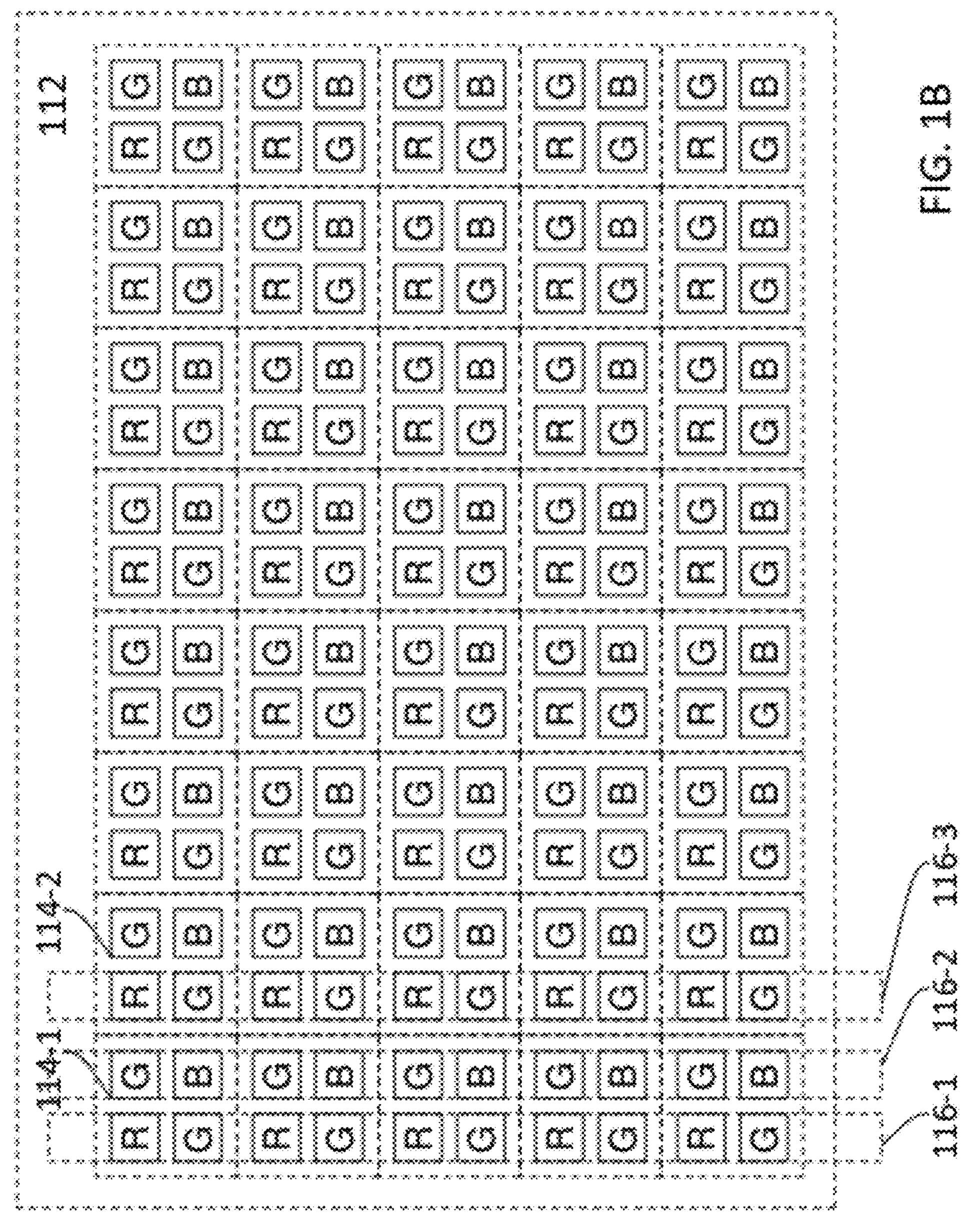
FIG. 1B illustrates an example light sensitive area of an image sensor, in accordance with some possible embodiments of the invention.

FIG. 1B illustrates an example light sensitive area (112) of an image sensor (e.g., 102 of FIG. 1A), in accordance with some possible embodiments of the invention. The light sensitive area (112) may comprise a plurality of pixels (e.g., 114-1, 114-2, etc.). For the purpose of the present invention, any one of a number of different color spaces may be used in an image processing system as described herein. For the purpose of illustration only, the image processing system (100) may use a red-green-blue (RGB) color space. In some possible embodiments, each (e.g., 114-1) of the pixels may comprise one or more light sensitive elements, arranged in one of one or more light sensitive element patterns; each of the light sensitive elements in a pixel (e.g., 114-1) may be configured to generate a response to light of certain colors. For example, the pixel (114-1) may comprise four light sensitive elements, in a pattern in which a first row comprises R and G and a second row comprises G and B. In some possible embodiments, the light sensitive element patterns in the pixels of the light sensitive area (112) may be created using a Bayer filter mosaic. In some possible embodiments, light sensitive elements labeled as "G" in FIG. 1B may be covered by a green filter; light sensitive elements labeled as "R" in FIG. 1B may be covered by a red filter; and light sensitive elements labeled as "B" in FIG. 1B may be covered by a blue filter. In some embodiments, a light sensitive element may also be responsive to one or more other light colors other than a designated color. For example, a "G" light sensitive element in an "RG" row may be responsive to blue light to a limited extent, while a "G" light sensitive element in a "GB" row may be responsive to red light to a limited extent. What light colors a specific light sensitive element in the light sensitive area (112) may depend on the structure and design of the pixel (e.g., as determined by the structure and design of the Bayer filter mosaic mentioned above) containing the specific light sensitive element.

In some possible embodiments, under techniques as described herein, an image processing system (e.g., 100 of FIG. 1A), or an image sensor (e.g., 102 of FIG. 1B), may comprise software and/or hardware configured to determine a digital value of a measurable imagery response in each of light sensitive elements in a pixel (e.g., 114-1), and to perform conversion operations (including algebraic manipulations of different digital values of different light sensitive elements (RG and GB) of the pixel (114-1)) that generate a pixel value for the pixel (114-1). In some possible embodiments, the pixel value may comprise component (or channel) values for all components (or channels) of the color space used in the image processing system (100). For example, in the RGB color space, a pixel value for a pixel (114-1) may comprise a component value for each of the red, green, and blue colors. In some possible embodiments, pixel values generated for pixels of the light sensitive area (112) may be within a relatively narrow dynamic range for luminance (which may be determined by the component values of R, G, and B in the RGB color space).

In some possible embodiments, an image sensor (e.g., 102 of FIG. 1A) may comprise electric charge registers (not shown; which may be aligned along the vertical direction of FIG. 1B) configured to receive electric charge packets transferred/shifted out of light sensitive elements in the light sensitive area (112) when a shutter operation including but not limited to an electronic shutter operation is performed, for example, through electrodes connected to the light sensitive elements and to the electric charge registers. In some possible embodiments, the electric charge registers and the light sensitive elements may be interleaved in the light sensitive area (112). In some possible embodiments, each different vertical column (e.g., 116-1) of light sensitive elements may correspond to a different vertical column of electric charge registers. In some possible embodiments, two or more vertical columns (e.g. 116-1, 116-2, 116-3, etc.) of light sensitive elements may correspond to a single vertical column of electric charge registers. In some possible embodiments, the image sensor (102), or the light sensitive area (112) therein, may comprise software and hardware components to transfer/shift electric charge packets out of the electric charge registers (e.g., along a horizontal direction of FIG. 1B), and to sample/convert the electric charge packets into digital image data of a scene.

In some possible embodiments, an image sensor (e.g., 102 of FIG. 1A) may optionally and/or alternatively employ multi-field readout techniques. In some possible embodiments, light sensitive elements in the image sensor (102) may be grouped into a plurality of (e.g., interleaved) light sensitive fields. As used herein, different light sensitive fields may not occupy different exclusive spatially contiguous fields but may interleave with one another spatially. In some possible embodiments, different light sensitive fields may share a common set of electrode lines. Thus, an image sensor implementing multi-field readout techniques may have fewer electrode lines, and may be able to engineer more light sensitive elements in a unit area than otherwise. In some possible embodiments, multi-field readout techniques as described herein may, but are not limited to one or more of, support reading out measurable imagery responses from the light sensitive fields in a sequential order, in a round-robin, in a different order including repeatedly reading out one or more of the light sensitive fields, etc.

In some possible embodiments, measurable imagery responses of light sensitive elements in the plurality of light sensitive fields may be shifted out of the light sensitive elements one light sensitive field at a time. In some possible embodiments, measurable imagery responses of light sensitive elements in a light sensitive field may be shifted out of the light sensitive elements simultaneously.

In an example, light sensitive elements in the image sensor (102) may be grouped into two light sensitive fields. A first vertical column (e.g., 116-1 of FIG. 1B) of light sensitive elements may belong to a first light sensitive field; a second vertical column (e.g., 116-2 of FIG. 1B) of light sensitive elements may belong to a second light sensitive field; a third vertical column (e.g., 116-3 of FIG. 1B) of light sensitive elements may belong to the first light sensitive field; and so on.

In another example, light sensitive elements in the image sensor (102) may be grouped into three light sensitive fields. A first vertical column (e.g., 116-1 of FIG. 1B) of light sensitive elements may belong to a first light sensitive field; a second vertical column (e.g., 116-2 of FIG. 1B) of light sensitive elements may belong to a second light sensitive field; a third vertical column (e.g., 116-3 of FIG. 1B) of light sensitive elements may belong to a third light sensitive field; and so on.

In various possible embodiments, the number of light sensitive fields in an image sensor herein may be a finite positive number greater than one such as two, three, four, five, six, seven, eight, etc.

4. Operations for Capturing Multiple Images

Figure 2A:
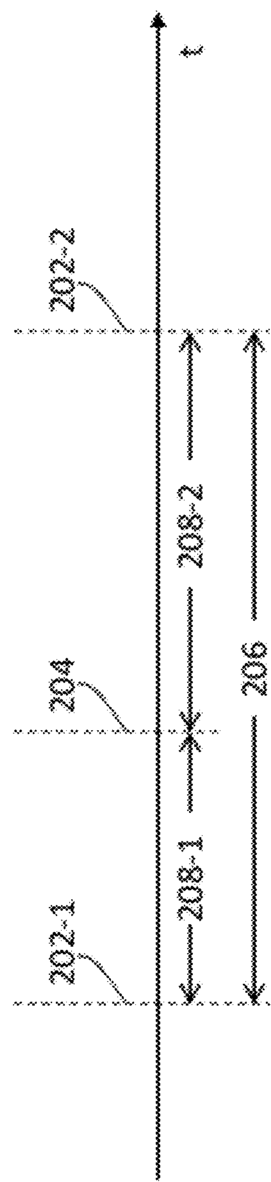
FIG. 2A and FIG. 2B illustrate example operations of an image processing system for capturing multiple images of a scene, in accordance with some possible embodiments of the present invention.

FIG. 2A illustrates example operations of an image processing system (e.g., 100) for capturing multiple images of a scene, in accordance with some possible embodiments of the present invention. A mechanical shutter with an image sensor (e.g., 102 of FIG. 1A) of the image processing system (100) may be opened at time 202-1 and closed at time 202-2 for a total time duration 206. In some possible embodiments, a number of optical, electronic, mechanical settings such as aperture settings, a time duration for the mechanical shutter to remain open, one or more focal lengths of one or more lenses, etc., may be set by an image sensor controller (104) of the image processing system (100) for the purpose of capturing the multiple images. Some of these settings may be caused or influenced by one or more user inputs provided to the image processing system (100) and/or by environment conditions (e.g., ambient light levels, subject light levels in the scene, etc.) detected/received by the image processing system (100). At time 202-1, measurable imagery responses from previous images if any may be cleared. An exposure timer may be used to count down to the time 202-2 at which the mechanical shutter may be closed.

At time 204, the image sensor controller (104), or an electronic shutter (e.g., 110 of FIG. 1A) therein, may transfer/shift first measurable imagery responses out of a part, or a whole, of light sensitive elements in the image sensor (102) to non-photoactive storage elements such as electric charge registers for (e.g., temporary or transitional) storage purposes.

Shifting the first measurable imagery responses as described above simultaneously ends a first exposure 208-1 that generates a first image of the scene and begins a second exposure 208-2 that generates a second image of the scene. At time 202-2, when the mechanical shutter closes, the second exposure 208-2, which generates the second image of the scene, ends. In some possible embodiments, the first measurable imagery responses may be read out of the non-photoactive storage elements while the second exposure 208-2 is in progress. In some possible embodiments, second measurable imagery responses accumulated during the second exposure 208-2 may be read out of the light sensitive element to the non-photoactive storage elements after the first measurable imagery responses from the first image have been moved and cleared out of the non-photoactive storage elements.

In some possible embodiments, the first image may be generated based on the first measurable imagery responses. In some possible embodiments, the first image may comprise information derived from the first measurable imagery responses. In some possible embodiments, the second image of the scene may be generated based on both the first measurable imagery responses and the second measurable imagery responses. In some other possible embodiments, the second image of the scene may be generated based on the second measurable imagery responses.

In a single field imager sensor, the first measurable imagery responses may comprise responses from an entire light sensitive area (e.g., 112 of FIG. 1B) for the first exposure 208-1; the second measurable imagery responses may comprise responses from the same entire light sensitive area (e.g., 112 of FIG. 1B) for the second exposure 208-2. The first measurable imagery responses, as well as the second measurable imagery responses, may be used to generate a full resolution image of the scene with all component colors.

In a multi-field image sensor, the first measurable imagery responses may comprise only responses from a first field of a light sensitive area (e.g., column 116-1 in light sensitive area 112 of FIG. 1B) accumulated for the first exposure 208-1; the second measurable imagery responses may comprise responses from the entire light sensitive area (e.g., 112 of FIG. 1B). In some possible embodiments, the second measurable imagery responses in the first field may comprise responses accumulated for the second exposure 208-2 only since the responses in the first field accumulated for the first exposure 208-1 have already been transferred/shifted out, while the second measurable imagery responses in other fields (or the other field in the case of a two-field image sensor) may comprise responses accumulated for both the first exposure 208-1 and the second exposure 208-2.

In some possible embodiments, algebraic operations such as aggregations may be performed for the responses from the light sensitive elements in the first field so that the second measurable imagery responses in the first field that are used in part to generate the second image may comprise responses accumulated for both the first exposure 208-1 and the second exposure 208-2.

In some other possible embodiments, algebraic operations such as aggregations may not be performed for the responses from the light sensitive elements in the first field. Instead, since the second measurable imagery responses in the first field and in other fields are obtained from different time durations respectively (e.g., the second exposure 208-2 for the first field and the first and second exposures 208-1 and 208-2 for the other fields), interpolation operations may be performed to correlate the second measurable imagery responses in the first field and the other fields. As used herein, an interpolation operation of two measurable imagery responses may refer to one or more (e.g., algebraic, table-driven, etc.) manipulations of one or both of the two corresponding measurable imagery responses based on one or more relationships between the two corresponding measurable imagery responses; the relationships may be based on exposure time durations related to the measurable imagery responses and/or physical characteristics of the light sensitive elements that generate the measurable imagery responses, etc. As a result of the interpolation operations, the second image may be generated comprising information derived from the second measurable imagery responses only.

In some possible embodiments, the first image and the second image, of the same scene, may be outputted by the image sensor (102) and may be stored in memory space (e.g., 106) of the image processing system (100) for further processing.

In some possible embodiments in which a light sensitive area (e.g., 112) of the image sensor (102) comprises a single light sensitive field, the first image may comprise measurable imagery responses from each individual light sensitive element (e.g., light sensitive elements in columns 116-1 and 116-2, 116-3, etc., of FIG. 1B) of the light sensitive area (112). In some possible embodiments in which a light sensitive area (e.g., 112) of the image sensor (102) comprises two light sensitive fields, the first image may comprise measurable imagery responses from light sensitive elements (e.g., light sensitive elements in column 116-1 and 116-3, but not in column 116-2, of FIG. 1B) in one half of the light sensitive area (112). In some possible embodiments in which a light sensitive area (e.g., 112) of the image sensor (102) comprises three light sensitive fields, the first image may comprise measurable imagery responses from light sensitive elements (e.g., light sensitive elements in column 116-1, but not in columns 116-2 and 116-3, of FIG. 1B) in a third of the light sensitive area (112). Thus, in some possible embodiments in which a light sensitive area (e.g., 112) of the image sensor (102) comprises N (a positive integer) light sensitive fields, the first image may comprise measurable imagery responses from light sensitive elements in a particular light sensitive field constituting one Nth of the light sensitive area (112).

In some possible embodiments in which the image processing system (100) uses a color space that comprises three or more component colors (e.g., red, green, and blue in a RGB color space), one component color in the color space may be missing from the first image. For example, in those embodiments in which a light sensitive area (e.g., 112) of the image sensor (102) comprises an even positive number of light sensitive fields, the first image may comprise measurable imagery responses from all of red light sensitive elements and one half of the green light sensitive elements, but not blue light sensitive elements, of the light sensitive area (112). It may be noted that in embodiments in which a two-light-sensitive-fields image sensor is used, the first image generated with techniques herein may still contain per pixel imagery data (e.g., only red and green information of an individual pixel), and hence may be of the same spatial resolution as that of the second image, even though a component color is missing in the first image. However, in other embodiments in which a four-light-sensitive-fields image sensor or a six-light-sensitive-fields image sensor (or still higher even number fields) is used, the first image generated with techniques herein may not contain per pixel imagery data (e.g., only red and green information of selected but not all pixels), and hence may be of a lower spatial resolution; in the meantime, a component color is missing in the first image.

On the other hand, in embodiments in which a light sensitive area (e.g., 112) of the image sensor (102) comprises an odd positive number of light sensitive fields, the first image may comprise measurable imagery responses from light sensitive elements of the light sensitive area (112) in all component colors. In a particular embodiment of these embodiments, light sensitive elements of different component colors from more than one pixel may be combined to generate a composite pixel. Thus, in embodiments in which a three-light-sensitive-fields image sensor or a five-light-sensitive-fields image sensor (or still higher odd number fields) is used, the first image generated with techniques herein may not contain per pixel imagery data (e.g., all component color information of selected but not all pixels), and hence may be of a lower spatial resolution.

Figure 2B:
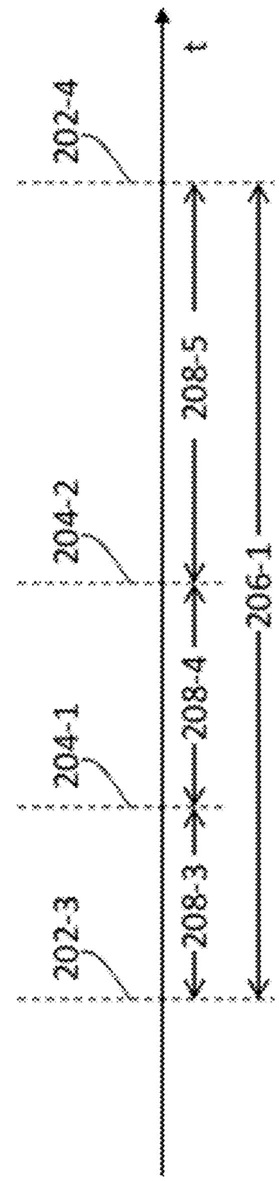
Figure 2C:
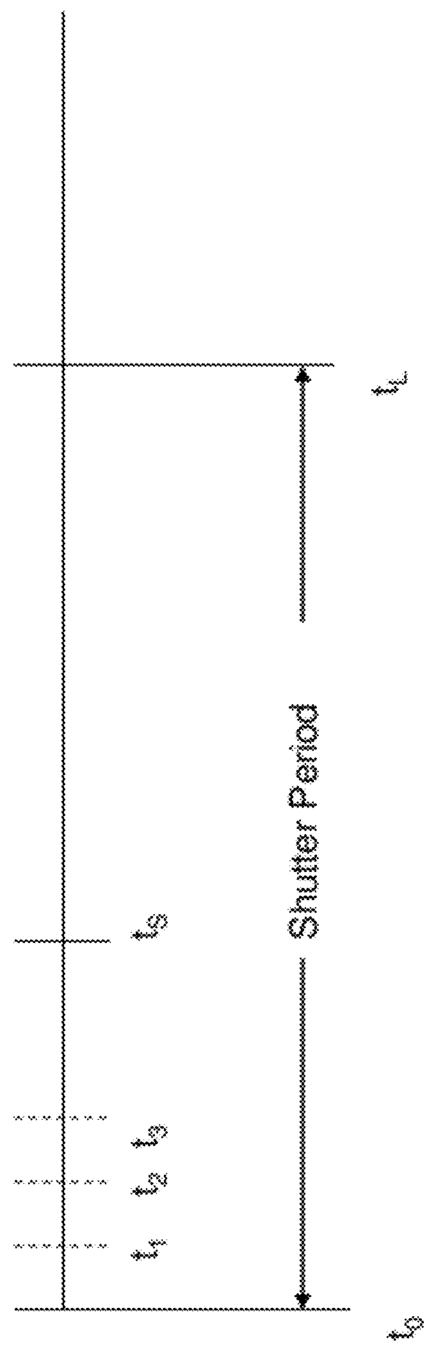
FIG. 2C and FIG. 2D illustrate example timelines for capturing multiple images of a scene, in accordance with some possible embodiments of the present invention.

FIG. 2C illustrates an example timeline of capturing an HDR image using a multi-field image sensor. In an example embodiment, a mechanical shutter is open from time $t_0$ to time $t_L$. From time $t_0$ to time $t_S$ is the total time for capturing a short exposure image. The short-exposure image is shifted to an image buffer (e.g., non-photoactive storage elements) from time to time. For example, after time $t_1$ and until time $t_2$, the first field is shifted out of the image sensor into the image buffer. After time $t_2$ and until time $t_3$, the second field is shifted out of the image sensor into the image buffer. Shifting of fields of the image sensor continues while the shutter is open and until $t_S$. The collection of these fields becomes a short exposure image, which may include all primary colors in some embodiments. After time $t_L$, all light sensitive fields are shifted for image sensory responses accumulated up to time $t_L$ (e.g., when the mechanical shutter is closed), thereby creating a long exposure image. The short exposure image and the long exposure image are then combined into an HDR image under techniques as described herein.

Figure 2D:
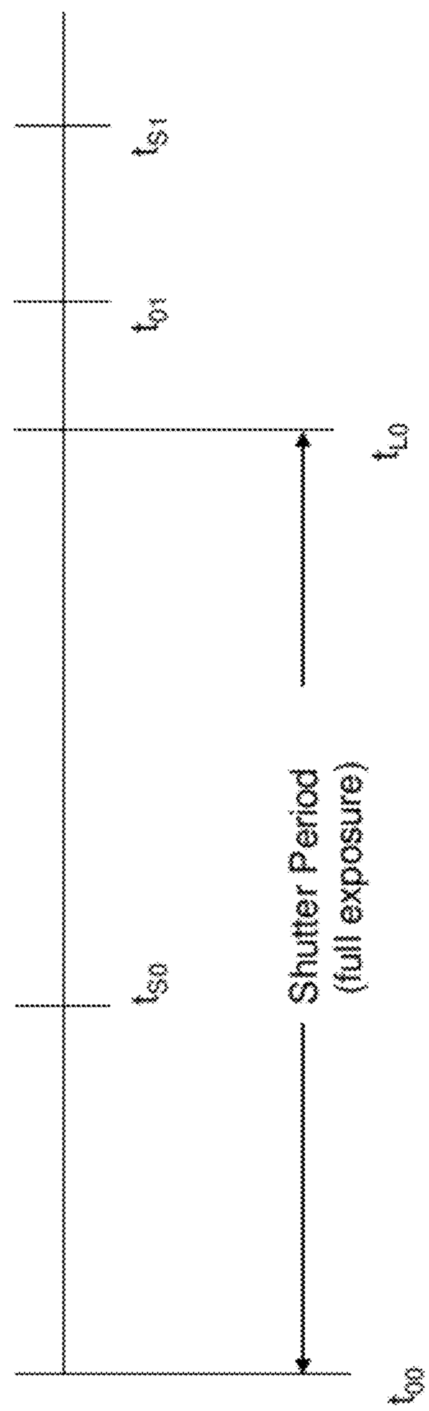

In an example embodiment, a first field of an image sensor is captured without all primary colors in a color space. FIG. 2D illustrates a further example timeline of capturing an HDR image using a multi-field image sensor. A mechanical shutter is open from time $t_{00}$ to time $t_{L0}$. From time $t_{00}$ to time $t_{s0}$ is a short exposure. After time $t_{s0}$, a first field of the image sensor is shift out. After time $t_{L0}$, which is the end of a long exposure, the remainder of the first field (captured between time $t_{s0}$ and time $t_{L0}$) and the remaining fields in the image sensor, captured from time $t_{00}$ to time $t_{L0}$, are shifted out. At this point, an image of the short exposure is obtained, which may be with missing primary colors. In addition, another image of the long exposure is also obtained, which may be with all primary colors. In some possible embodiments in which one of the obtained images is with missing primary colors, the missing primary colors are estimated, interpolated, or otherwise predicted.

In an example, after time $t_{L0}$, an image processing system herein takes another short exposure to obtain a second short exposure image, e.g., from time $t_{01}$ to time $t_{s1}$. This second exposure image has all the primary colors in the color space. Color ratios obtained with the second exposure image are used to interpolate the missing primary colors in the previous short exposure image. Alternatively and/or additionally, if the long exposure image was taken in quick succession after a previous picture, the color ratios of the previous picture to estimate the missing primary colors.

In another example, a library of HDR pictures (preferably taken by the same camera) is used to create a two-dimensional histogram of color ratios. This histogram is used to estimate or predict the missing primary colors.

5. Mixed Operational Modes for Capturing Multiple Images

Figure 3A:
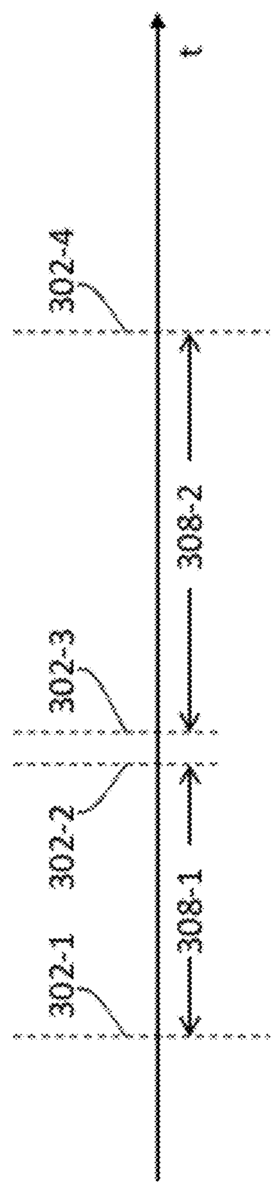
FIG. 3A illustrates example operations of an image processing system for capturing multiple images of a scene, in accordance with some possible embodiments of the present invention.

FIG. 3A illustrates example operations of an image processing system (e.g., 100) for capturing multiple images of a scene, in accordance with some possible embodiments of the present invention. A mechanical shutter with an image sensor (e.g., 102 of FIG. 1A) of the image processing system (100) may be opened at time 302-1 and closed at time 302-2 for an exposure time duration 308-1. In some possible embodiments, an image sensor controller (104) of the image processing system (100) may set a first operational mode for the exposure time duration 308-1. Some of optical, electronic, or mechanical settings of the image processing system (100) in the first operational mode may be caused or influenced by one or more user inputs provided to the image processing system (100) and/or by environment conditions (e.g., ambient light levels, subject light levels in the scene, etc.) detected/received by the image processing system (100). At time 302-1, measurable imagery responses from previous images if any may be cleared. An exposure timer may be used to count down to the time 302-2 at which the mechanical shutter may be closed. At time 302-2, the image sensor controller (104) may transfer/shift first measurable imagery responses out of light sensitive elements in the image sensor (102) to non-photoactive storage elements such as electric charge registers for (e.g., temporary or transitional) storage purposes.

Shifting the first measurable imagery responses as described above simultaneously ends a first exposure 308-1 that generates a first image of the scene. In some possible embodiments, a second exposure 308-2 that will generate a second image of the scene begins at time 302-3.

In some possible embodiments, the image sensor controller (104) may set a second different operational mode for the exposure time duration 308-2. Some of optical, electronic, or mechanical settings of the image processing system (100) in the second operational mode may be caused or influenced by one or more user inputs provided to the image processing system (100) and/or by environment conditions (e.g., ambient light levels, subject light levels in the scene, etc.) detected/received by the image processing system (100).

At time 302-4, when the mechanical shutter closes, the second exposure 308-2 ends. In some possible embodiments, the first measurable imagery responses may be read out of the non-photoactive storage elements while the second exposure 308-2 is in progress. In some possible embodiments, second measurable imagery responses accumulated during the second exposure 208-2 may be read out of the light sensitive element to the non-photoactive storage elements after the first measurable imagery responses from the first image have been moved and cleared out of the non-photoactive storage elements.

In some possible embodiments, the first image may be generated based on the first measurable imagery responses. In some possible embodiments, the second image of the scene may be generated based on both the first measurable imagery responses and the second measurable imagery responses. Since the first measurable imagery responses and the second measurable imagery responses are obtained from different exposures (e.g., the first and second exposures 308-1 and 308-2), interpolation operations may be performed to correlated the first measurable imagery responses and the second measurable imagery responses. In some other possible embodiments, the second image of the scene may be generated based on only the second measurable imagery responses (e.g., not based on the first measurable imagery responses).

In some possible embodiments, the first image and the second image, of the same scene, may be outputted by the image sensor (102) and may be stored in memory space (e.g., 106) of the image processing system (100) for further processing.

In some possible embodiments, at least one of the first image and the second image as discussed above may be a high resolution image (e.g., a still photographic image with a still image operational mode or a high resolution operational mode). In some possible embodiments, at least one of the first image and the second image may be a low resolution image (e.g., a video frame with a video operational mode or a low resolution operational mode). In some possible embodiments, at least one of the first image and the second image may comprise data for all component colors of a color space (e.g., red, blue, and green in the RGB color space). In some possible embodiments, at least one of the first image and the second image may comprise data for some but not all of component colors in the color space (e.g., red and green, but not blue in the RGB color space).

For the purpose of illustration, it has been described that the first exposure 308-1 may be ended with the closing of the mechanical shutter. It should be noted that for the purpose of the invention, a first exposure herein may be ended with an electronic shutter operation. For example, instead of closing the mechanical shutter at time 302-2 at the end of the first exposure and opening the mechanical shutter at time 302-3 at the start of the second exposure, an electronic shutter operation may be used to end the first exposure and to begin the second exposure. In some possible embodiments, even when an electronic shutter operation is used, the operational modes of the first exposure and the second exposure may be different. Therefore, these and other ways of capturing multiple images of a scene with different operational modes may be used for the purpose of the present invention.

In some possible embodiments, the time interval between the end (time 302-2) of the first exposure 308-1 and the start (time 302-3) of the second exposure 308-2 may be relatively short, and may even be zero or close to zero (e.g., when an electronic shutter operation is implemented to end the first exposure 308-1 and to start the second exposure 308-2).

6. Mixed Operational Modes in Light Sensitive Area

Figure 3B:
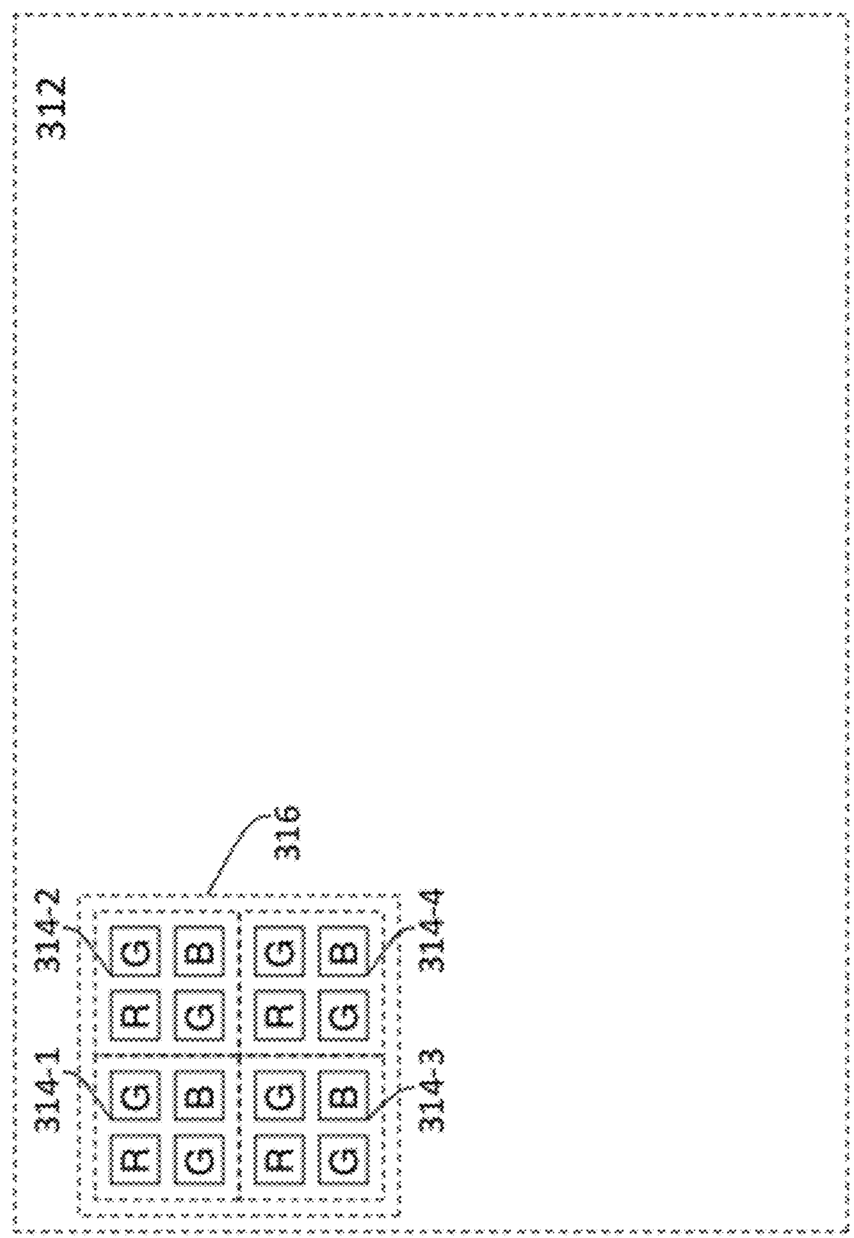
FIG. 3B illustrates an example light sensitive area that may be used by an image processing system to support capturing multiple images of a scene in different operational modes, in accordance with some possible embodiments of the invention.

FIG. 3B illustrates an example light sensitive area (312) that may be used by an image processing system (e.g., 100 of FIG. 1A) to support capturing multiple images of a scene in different operational modes, in accordance with some possible embodiments of the invention. In some possible embodiments, the light sensitive area (312) may be the same as, or similar to, the light sensitive area (112) of FIG. 1B.

In some possible embodiments, when the image processing system (100) is set to a specific high resolution mode (e.g., a still image operational mode), one or more light sensitive elements in a pixel (e.g., 314-1) of the light sensitive area (312) may be used to produce image data for one pixel in an output image (e.g., the first image discussed above in connection with FIG. 3A). In some possible embodiments, when the image processing system (100) is set to a specific low resolution mode (e.g., a video operational mode), one or more light sensitive elements in a plurality of pixels (e.g., 314-1 through 314-4) of the light sensitive area (312) may be used to produce image data for one pixel in an output image (e.g., the second image discussed above in connection with FIG. 3A). For the purpose of the present invention, summing (e.g., summing electric charges from two or more light sensitive elements of the same type), averaging, mean value computing, sub-sampling, Gaussian filtering, non-Gaussian filtering, etc., or combinations of some of the foregoing, performed in an analog or digital representation, may be used to generate image data for a pixel in the output image from a plurality of pixels (314-1 through 314-4) of the light sensitive area (312) in an operational mode (e.g., a video mode, a preview mode, or any operational mode in which the spatial resolution is below a full resolution supported by the imaging processing system (100)).

For the purpose of illustration only, it has been described that four pixels of an image sensitive area may be used to generate image data for a pixel of an output image. For the purpose of the present invention, a different plurality of, for example, 8, 16, etc., pixels of an image sensitive area may be used to generate image data for a pixel of an output image.

7. Additional Exposure to Complement Missing Component Color

FIG. 2B illustrates example operations of an image processing system (e.g., 100) for capturing multiple images of a scene, in accordance with some possible embodiments of the present invention. The mechanical shutter with an image sensor (e.g., 102 of FIG. 1) of the image processing system (100) may be opened at time 202-3 and closed at time 202-4 for a total time duration 206-1. In some possible embodiments, a number of optical, electronic, mechanical settings such as aperture settings, a time duration for the mechanical shutter to remain open, one or more focal lengths of one or more lenses, etc., may be set by an image sensor controller (104) of the image processing system (100) for the purpose of capturing the multiple images. Some of these settings may be caused or influenced by one or more user inputs provided to the image processing system (100) and/or by environmental conditions (e.g., ambient light levels, subject light levels in the scene, etc.) detected/received by the image processing system (100). At time 202-3, measurable imagery responses from previous images, if any, may be cleared. An exposure timer may be used to count down to the time 202-4 at which the mechanical shutter may be closed.

At time 204-1, the image sensor controller (104), or an electronic shutter (e.g., 110 of FIG. 1A) therein, may transfer/shift first measurable imagery responses out of a part, or a whole, of light sensitive elements in the image sensor (102) to non-photoactive storage elements such as electric charge registers for (e.g., temporary or transitional) storage purposes. Shifting the first measurable imagery responses as described above simultaneously ends a first exposure 208-3 that generates the first measurable imagery responses of the scene and begins a second exposure 208-4 that will generate second measurable imagery responses of the scene.

At time 204-2, the image sensor controller (104), or the electronic shutter (110) therein, may transfer/shift the second measurable imagery responses out of a part, or a whole, of the light sensitive elements in the image sensor (102) to the non-photoactive storage elements for (e.g., temporary or transitional) storage purposes. In some possible embodiments, the first measurable imagery responses may be read out of the non-photoactive storage elements while the second exposure 208-4 is in progress. In some possible embodiments, second measurable imagery responses accumulated during the second exposure 208-4 may be read out of the light sensitive element to the non-photoactive storage elements after the first measurable imagery responses have been moved and cleared out of the non-photoactive storage elements. Shifting the second measurable imagery responses as described above simultaneously ends a second exposure 208-4 that generates the second measurable imagery responses of the scene and begins a third exposure 208-5 that will generate third measurable imagery responses of the scene.

At time 202-4, when the mechanical shutter closes, the third exposure 208-5, which generates the third measurable imagery responses of the scene, ends. In some possible embodiments, the second measurable imagery responses may be read out of the non-photoactive storage elements while the third exposure 208-5 is in progress. In some possible embodiments, third measurable imagery responses accumulated during the second exposure 208-5 may be read out of the light sensitive element to the non-photoactive storage elements after the second measurable imagery responses have been moved and cleared out of the non-photoactive storage elements.

In some possible embodiments, two images may be generated from the first, second, and third measurable imagery responses. In some possible embodiments, a first image may be generated based on the first and second measurable imagery responses. In some possible embodiments, a second image of the scene may be generated based on the third measurable imagery responses. In some other possible embodiments, the second image of the scene may be generated based on the third measurable imagery responses and either or both of the first measurable imagery responses and the second measurable imagery responses.

In a single field image sensor, each of the first measurable imagery responses, the second measurable imagery responses, and the third measurable imagery responses may comprise responses from an entire light sensitive area (e.g., 112 of FIG. 1B), albeit for possibly different time durations depending on the first, second and third exposures 208-3, 208-4, and 208-5. Each of the first measurable imagery responses, the second measurable imagery responses, and the third measurable imagery responses may be used to generate a full resolution image of the scene with all component colors.

In a multi-field image sensor, the first measurable imagery responses may comprise only responses from a first field of a light sensitive area (e.g., column 116-1 in light sensitive area 112 of FIG. 1B) accumulated for the first exposure 208-1, while the second measurable imagery responses may comprise responses from a second field of the light sensitive area (e.g., column 116-2 in light sensitive area 112 of FIG. 1B). In some possible embodiments, the first measurable imagery responses in the first field may comprise responses accumulated for the first exposure 208-3, while the second measurable imagery responses in the second field may comprise responses accumulated for the first and second exposures 208-3 and 208-4. The third measurable imagery responses in the first field may comprise responses accumulated for the second and third exposures 208-4 and 208-5, since the responses in the first field accumulated for the first exposure 208-3 have already been transferred/shifted out. The third measurable imagery responses in the second field may comprise responses accumulated for the third exposure 208-5, since the responses in the second field accumulated for the first and second exposures 208-3 and 208-4 have already been transferred/shifted out. In some possible embodiments, the third measurable imagery responses in other fields if any (e.g., a four-field image sensor) may comprise responses accumulated for the first, second and third exposures 208-3, 208-4 and 208-5.

In some possible embodiments, algebraic operations such as aggregations may be performed for the responses from the light sensitive elements in the first or second field so that the responses in the first or second field that are used at least in part to generate one of the first and second images may be made the same in exposure time durations.

In some possible embodiments, since the third measurable imagery responses in the first field, in the second field, and in other fields if any, are obtained from different time durations respectively (e.g., the second and third exposures 208-4 and 208-5 for the first field, the third exposure 208-5 for the second field, and the first, second and third exposures 208-3, 208-4 and 208-5 for the other fields if any), interpolation operations may be performed to correlate the third measurable imagery responses in the first field, the second field, and the other fields.

Thus, in some possible embodiments, since different measurable imagery responses may be obtained from different time durations, interpolation operations may be performed to correlate the different measurable imagery responses for normalization or comparison purposes.

In some possible embodiments, the first image and the second image, of the same scene, may be outputted by the image sensor (102) and may be stored in memory space (e.g., 106) of the image processing system (100) for further processing.

In some possible embodiments in which the image processing system (100) uses a color space that comprises three or more component colors (e.g., red, green, and blue in a RGB color space), one component color in the color space may be missing from the first measurable imagery responses. For example, in those embodiments in which a light sensitive area (e.g., 112) of the image sensor (102) comprises an even positive number of light sensitive fields, the first measurable imagery responses may comprise measurable imagery responses from all of red light sensitive elements and one half of the green light sensitive elements, but not blue light sensitive elements, of the light sensitive area (112); the second measurable imagery responses may comprise measurable imagery responses from all of blue light sensitive elements and the other half of the green light sensitive elements, but not red light sensitive elements, of the light sensitive area (112). By combining at least the first and second measurable imagery responses into both of the first and second images may make sure that both images comprise image data for all component colors of the color space used in the image processing system (100).

It has been shown that techniques as described herein may be used to create two images with different spatial resolution and/or different color content. Since the images may be produced with different exposures, the images of the same scene with different luminance levels and/or different spatial resolutions and/or different color contents may be generated under the techniques. In some possible embodiments, the same techniques may be used to generate more than two images of the same scene with different luminance levels and/or different spatial resolutions and/or different color contents.

8. Predicting Missing Component Color

In various possible embodiments, instead of using measurable imagery responses from multiple exposures to create an image (e.g., the first image discussed in connection with FIG. 2B), an image generated under techniques herein may or may not be missing one or more component colors. In some possible embodiments in which an image is missing a component color, instead of using measurable imagery responses (e.g., the second measurable imagery responses discussed in connection with FIG. 2B) to complement the missing color in the image, pixel values for the missing component color in the image may be predicted.

In some possible embodiments, one or more histograms may be used to predict a pixel value for the missing component color (e.g., the blue part of a RGB pixel value if blue is the missing component color). The one or more histograms may be generated in one or more of various different methods. In an example, a histogram as described herein may be computed using pixel values in a reference image of the same scene, wherein the pixel values in the reference image may comprise all component colors. The reference image as described herein for generating the histograms may be any image that does not have a missing component color and be of the same scene. In some possible embodiments, the reference image may comprise pixel values at least in part through interpolation and/or extrapolation and/or other image processing operations. In some possible embodiments, the reference image may be obtained from a pre-shot of the scene, a post-shot of the scene, a photometric shot of the scene, a view finder type of shot of the scene, etc.

In some possible embodiments, a histogram here may represent a relationship among all component colors (which may number to three, four, five, six, etc. in various possible embodiments) of a color space such that, given pixel values for two or more component colors of the color space, pixel values for one or more other (missing) component colors may be determined. In some possible embodiments, a histogram as described herein may be implemented as one or more pixel value functions each of which has pixel values of the two or more component colors as independent variables; the one or more pixel value functions generate pixel values for the one or more missing component colors when the pixel values of the two or more component colors are known. In some possible embodiments, the pixel values of the two or more component colors may be provided by an image for which the pixel values for the missing component colors are to be predicted with one or more histograms as described herein.

For the purpose of illustration, it has been described that a reference image used to generate at least in part a histogram herein may be of the same scene as that of an image for which pixel values for one or more component colors are to be predicted with the histogram. It should be noted that the present invention is not so limited. In an example, instead of using a reference image of the same scene, other reference images may be used. For example, one or more reference images of the same or different scenes may be used to construct a histogram as described herein. None, some, or all of these reference images may be from an image collection. In some possible embodiments, the image collection may be preconfigured on or off an image processing system (e.g., 100) herein. In another example, one or more black-body radiation spectrums comprising relationships of light wavelengths at one or more given temperature or other factors may be used to predict/estimate other colors given some known colors. In some possible embodiments, only histograms computed may be configured on an image processing system (e.g., 100), but not reference images or an image collection or black-body radiation spectrums. Therefore, these and other ways of constructing histograms for the purpose of predicting one or more missing component colors may be used for the purpose of the present invention.

In some possible embodiments, one of one or more images generated using techniques herein may be of a lower spatial resolution than that of another of the one or more images. In some possible embodiments, the image of the lower spatial resolution may comprise a lower number of pixels than the image of a higher spatial resolution. In some possible embodiments, the image of the lower spatial resolution may be upsampled. For example, an empty stack frame comprising the same number of pixels as the image of the higher spatial resolution may be used to contain pixel values upsampled from the image of the lower spatial resolution. Upsampling may scale up in the spatial dimensions, but not in the spatial resolution. In some possible embodiments, a pixel value in the image of the lower spatial resolution may be used to set a plurality of pixels (as determined by a ratio of the number of pixels in the image of the higher resolution versus the number of pixels in the image of the lower resolution) in the stack frame.

In some possible embodiments, multiple images as generated from an image processing system (e.g., 100) of the same scene may be used to create/generate an HDR image of the scene. In some possible embodiments, one or more images herein may comprise image data affected by smearing, for example, caused by an electronic shutter operation that transfers/shifts measurable imagery responses from light sensitive elements while continually exposing the light sensitive elements to incoming light. In some embodiments, such smearing may be compensated for by comparing image data for a first image, which may comprise image data transferred/shifted out while the mechanical shutter remains open, to image data for a second image and/or a third image, which may be transferred/shifted out after the mechanical shutter has been closed. In some possible embodiments, data corresponding to columns from the first image that are in shadow, and therefore not affected too much by smearing, are selected and data from those columns is used to gain detail in shadow portions of an HDR image that is obtained by combining image data from the second image and/or the third image. In some possible embodiments, the image data from the first image may be used to contribute to the HDR image without compensating for smearing. In some such embodiments, data from the first image may be weighted differently in creating the HDR image than data from the second image and/or the third image.

In some possible embodiments, multiple images generated under techniques as described herein may have at least two different exposures. For example, one of the multiple images may have a longer exposure than another of the multiple images. In some possible embodiments, an image processing system (e.g., 100) may look through an image (e.g., a full spatial resolution image) to locate overexposed and/or underexposed pixels. The pixel values for these overexposed and/or underexposed pixels may be corrected with pixel values for the same pixels from one or more different images. In some possible embodiments, the one or more different images may comprise image data for all component colors of a color space in effect. In various possible embodiments, any of the one or more different images herein may comprise predicted pixel values, interpolated and/or extrapolated pixel values, or pixel values complemented by measurable imagery responses from one or more different exposures.

In some possible embodiments, the multiple images that are used to generate an HDR image may not necessarily be from a single mechanical shutter operation. In some possible embodiments, the multiple images that are used to generate an HDR image may not necessarily be from a single electronic shutter operation.

In some possible embodiments, histograms as described herein may be segmented. For example, a histogram may be used to predict missing color components for a spatial segment of an image, rather than all spatial portions of the image. For example, a bottom segment of the image may use a histogram that is different from one used in a top segment of the image. In some embodiments, one or more reference images may be divided into multiple segments (possibly overlapping). Pixel values from each of the multiple segments may be used to determine at least a segmented histogram as described herein.

Figure 6:
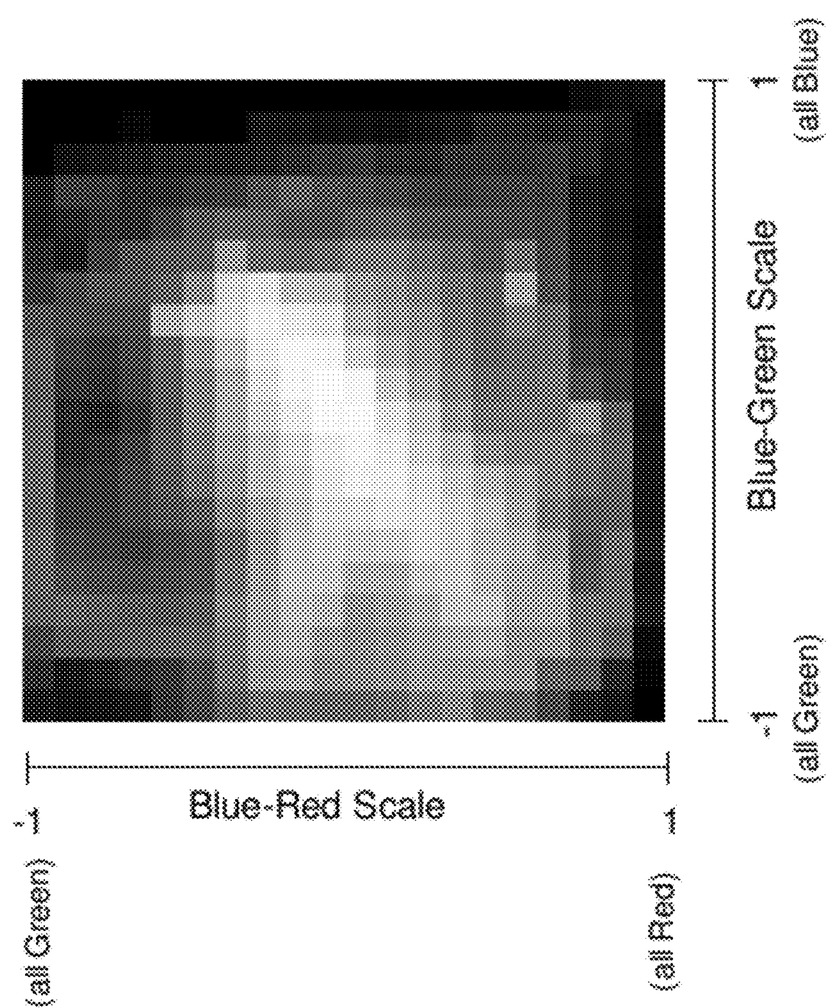
FIG. 6 illustrates an example histogram for predicting missing colors, according a possible embodiment of the present invention.

In an example embodiment, a set of HDR images is used to generate a joint histogram that relates color channel ratios. FIG. 6 illustrates example histogram bins derived from a set of 436 HDR images. In FIG. 6, the brightness of each patch represents population frequency. One or both of Red-Green and Blue-Green scales in FIG. 6 may be used to determine a missing primary color (e.g., blue, red, etc.) using a ratio (e.g., between red and green, between blue and green. The ratio may be used to determine which histogram line (e.g., row or column) to use in determining the missing primary color.

In an example, an image contains a pixel with a missing blue color. The red and green channels of the pixel are used to compute a Red-Green ratio for the pixel. If the ratio is very small, the top row of the joint histogram of FIG. 6 is used to find the mean value for the Blue-Green ratio based on that row's statistics. The mean value may be used to predict the missing primary color (blue). This simple technique performs surprisingly well, especially when the statistics for the histogram are gathered from similar images. A basic enhancement of only taking statistics for the highlights in the HDR images may be followed in some possible embodiments in which the histogram is applied to short exposures with missing primary colors. On the other hand, a basic enhancement of only taking statistics for the shadows in the HDR images may be followed in some possible embodiments in which the histogram is applied to long exposures with missing primary colors.

Other optimizations may also be used, such as using histogram data from another exposure to decide what to do with an image with a missing primary color. A mixture of statistics gathered over many images with statistics including images from the current scene may be used and may be proved especially valuable, in tie-breaking or deciding cases where the histogram has multiple peaks (e.g., bimodal regions).

In an example, a set of HDR images is used to determine a joint histogram of red ratios and blue ratios, defined as:

red_ratio=(red−grn)/(red+grn)

blu_ratio=(blu−grn)/(blu+grn)

The values of the ratios go from −1 to 1. In an example embodiments, only pixels whose luminance is above a certain threshold (e.g., 1 EV above the linear average luminance) are used so as to relate to the brighter portions of the image with a missing primary color, as expected from a shorter exposure.

The histogram built under techniques herein is used to determine the most likely color value for a missing primary color, given one or more ratios between the non-missing primary colors. For example, if a pixel is with a missing red color, but the blu_ratio is known to be 0.3, the mean value (or mode) for the red_ratio at the blu_ratio is assigned for the purpose of estimating or predicting a value for the red channel. The value for the red channel may be computed as follows:

red=grn*(1+red_ratio)/(1−red_ratio)

wherein red_ratio is assumed to be less than one (1).

Similarly, a value for the blue channel may be estimated or predicted based on the histogram, given a red_ratio.

9. Example Process Flow

Figure 4A:
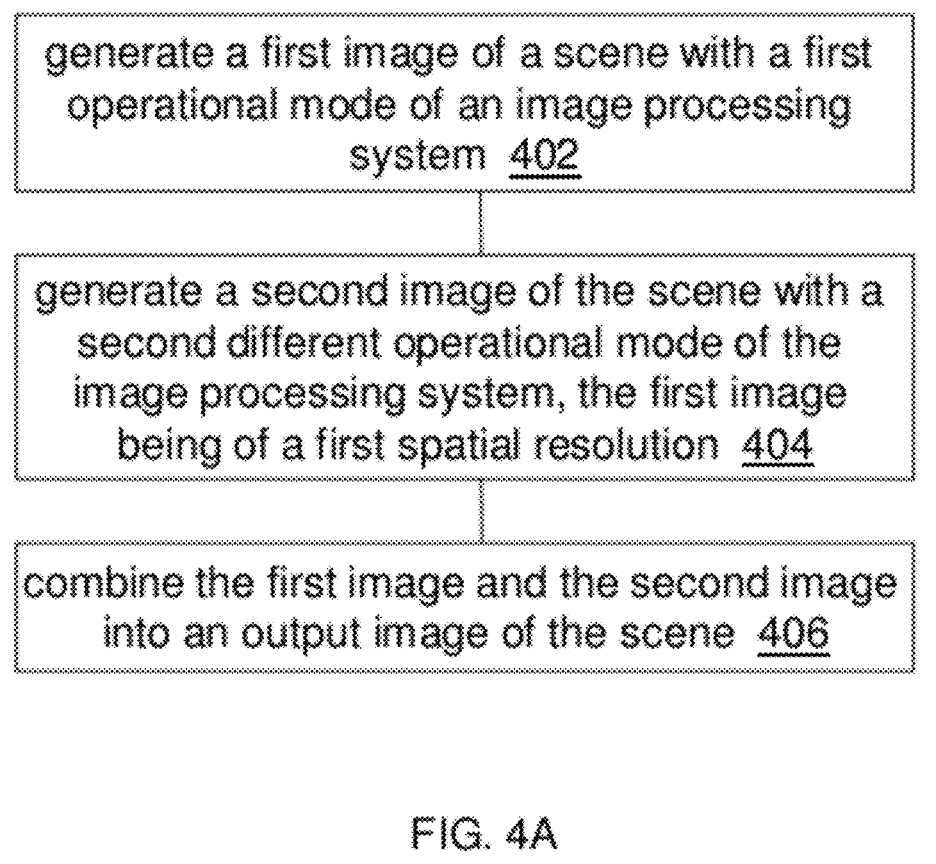

FIG. 4A illustrates an example process flow according to a possible embodiment of the present invention. In some possible embodiments, one or more computing devices or components such as an image processing system (e.g., 100) may perform this process flow. In block 402, the image processing system (100) may generate a first image of a scene with a first operational mode (e.g., one of still image mode, programmatically optimal mode, manual mode, video mode, preview mode, full resolution mode, partial mode, histogram mode, etc.) of the image processing system.

In block 404, the image processing system (100) may generate a second image of the scene with a second different operational mode (e.g., a different one of still image mode, programmatically optimal mode, manual mode, video mode, preview mode, full resolution mode, partial mode, histogram mode, etc.) of the image processing system. The first image may be of a first spatial resolution, while the second image may be of a second spatial resolution. In a possible embodiment, the first spatial resolution may be higher than the second spatial resolution.

In block 406, the image processing system (100) may combine the first image and the second image into an output image of the scene. The output image may be of a higher dynamic range than either of the first image and the second image and may be of a spatial resolution higher than the second spatial resolution.

In some possible embodiments, the first operational mode may be a full resolution operational mode of the image processing system, while the second operational mode may be a low resolution mode, in relation to the first operational mode, of the image processing system. In some other possible embodiments, the first operational mode may not be a full resolution operational mode of the image processing system, while the second operational mode may be a high resolution mode, in relation to the first operational mode, of the image processing system.

In some possible embodiments, the first image may be generated with a first exposure, while the second image may be generated with a second exposure. In a particular possible embodiment, the first image may be more exposed than the second image. In another particular possible embodiment, the first image may be less exposed than the second image.

In some possible embodiments, the first image may comprise first pixel values for a first plurality of subsets of pixels, whereas the second image may comprise second pixel values for a second plurality of pixels. Here, each different individual subset of pixels in the first image has a one-to-one correspondence relationship with a different individual pixel of the second image.

In some possible embodiments, the image processing system (100) may upsample the second image to a stack frame that comprises a same number of pixels as the first image so the first and second images may be combined into the output image.

In some possible embodiments, the output image may be of a spatial resolution the same as the higher of the first and second images. In some possible embodiments, the output image may be of a spatial resolution between those of the first and second images. In some possible embodiments, a first pixel in the output image may have a first luminance value derived from one or more first luminance values for one or more first pixels in the first image, while a second pixel in the output image may have a second luminance value derived from one or more second luminance values for one or more second pixels in the second image.

Figure 4B:
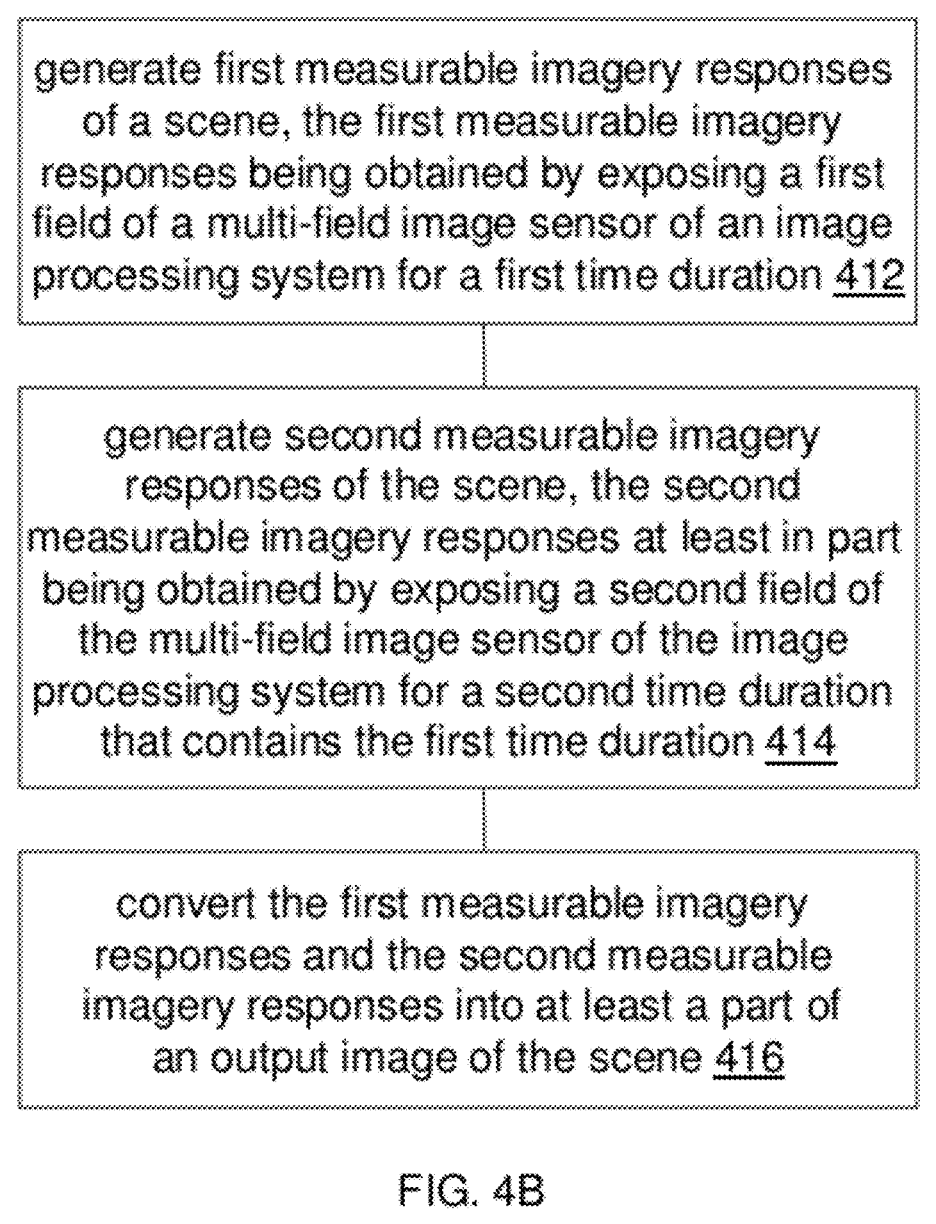

FIG. 4B illustrates an example process flow according to a possible embodiment of the present invention. In some possible embodiments, one or more computing devices or components such as an image processing system (e.g., 100) may perform this process flow. In block 412, the image processing system (100) may generate first measurable imagery responses of a scene. The first measurable imagery responses may be obtained by exposing a first field of a multi-field image sensor of an image processing system for a first time duration.

In block 414, the image processing system (100) may generate second measurable imagery responses of the scene. The second measurable imagery responses at least in part may be obtained by exposing a second field of the multi-field image sensor of the image processing system for a second time duration that contains the first time duration.

In block 416, the image processing system (100) may convert the first measurable imagery responses and the second measurable imagery responses into at least a part of an output image of the scene. The output image may have a higher dynamic range than either of the first measurable imagery responses and the second measurable imagery responses.

In some possible embodiments, the first field and the second field mentioned above may be interleaved.

In some possible embodiments, the second measurable imagery responses may further comprise measurable imagery responses in the first field for a time duration equal to a difference between the first time duration and the second time duration.

In some possible embodiments, the image processing system (100) may be configured with a color space; the first measurable imagery responses may comprise imagery responses for one or more component colors that are fewer than a full complement of component colors in the color space.

In some possible embodiments, the image processing system (100) may generate third measurable imagery responses of the scene; the third measurable imagery responses at least in part may be obtained by exposing a third field of the multi-field image sensor of the image processing system for a third time duration that contains the second time duration. In some such embodiments, to convert the first measurable imagery responses and the second measurable imagery responses into at least a part of an output image of the scene, the image processing system (100) may convert the first measurable imagery responses, the second measurable imagery responses and the third measurable imagery responses into the output image.

In some possible embodiments, the image processing system (100) may be configured with a color space. In some such embodiments, a full complement of component colors in the color space may comprise component colors from the first measurable imagery responses and the second measurable imagery responses.

In some possible embodiments, the image processing system (100) may generate, based on (1) the first measurable imagery responses and (2) the second measurable imagery responses, a first image of the scene, wherein the first image may have the full complement of component colors in the color space. Further, the image processing system (100) may generate, based on (1) the first measurable imagery responses, (2) the second measurable imagery responses, and (3) the third measurable imagery responses, a second image of the scene, wherein the second image may have the full complement of component colors in the color space. In some such embodiments, to convert the first measurable imagery responses, the second measurable imagery responses and the third measurable imagery responses into the output image, the image processing system (100) may combine the first image and the second image into the output image of the scene.

In some possible embodiments, the image processing system (100) may be configured with a color space; a full complement of component colors in the color space may comprise component colors from the first measurable imagery responses and the second measurable imagery responses.

In some possible embodiments, the image processing system (100) may generate, based at least in part on the first measurable imagery responses, a first image of the scene, wherein the first image may have the full complement of component colors in the color space. Further, the image processing system (100) may generate, based on (1) the first measurable imagery responses and (2) the second measurable imagery responses, a second image of the scene, wherein the second image may have the full complement of component colors in the color space. In some such embodiments, to convert the first measurable imagery responses and the second measurable imagery responses into at least a part of an output image, the image processing system (100) may combine the first image and the second image into the output image of the scene.

In some possible embodiments, one or more pixels values for at least one component color in the first image are predicted. In some possible embodiments, the one or more pixel values may be predicted with one or more histograms. In some possible embodiments, a histogram as described herein may be derived in part from one or more of the first measurable imagery responses and the second measurable imagery responses. In some possible embodiments, a histogram as described herein may be derived from neither the first measurable imagery responses nor the second measurable imagery responses. In some possible embodiments, a histogram as described herein may be derived in part from an image in an image collection. In some possible embodiments, one or more pixel values for at least one component color in the first image may be predicted with a black-body radiation spectrum.

FIG. 4C illustrates an example process flow according to a possible embodiment of the present invention. In some possible embodiments, one or more computing devices or components such as an image processing system (e.g., 100) may perform this process flow. In block 422, the image processing system (100) may receive a first image of a scene, wherein the first image may have a first dynamic range.

In block 424, the image processing system (100) may receive a second image of the scene, wherein the second image may have a second different dynamic range.

In block 426, the image processing system (100) may predict, based at least in part on the second image, one or more pixel values of the first image for a component color.

In block 428, the image processing system (100) may generate, based at least in part on the first image and the one or more pixel values predicted based at least in part on the second image, an output image of the scene, wherein the output image may have a higher dynamic range than either of the first image and the second image.

In some possible embodiments, the component color mentioned above may be missing in the first image.

In some possible embodiments, the first image may comprise at least one of over-exposed pixels and under-exposed pixels.

In some possible embodiments, the pixel values for the component color may be predicted with one or more histograms at least one of which is derived in part from the second image.

In some possible embodiments, the pixel values for the component color may be predicted with one or more histograms at least one of which is derived in part from an image in an image collection.

In some possible embodiments, at least one of the pixel values for the component color may be predicted with a black-body radiation spectrum.

10. Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
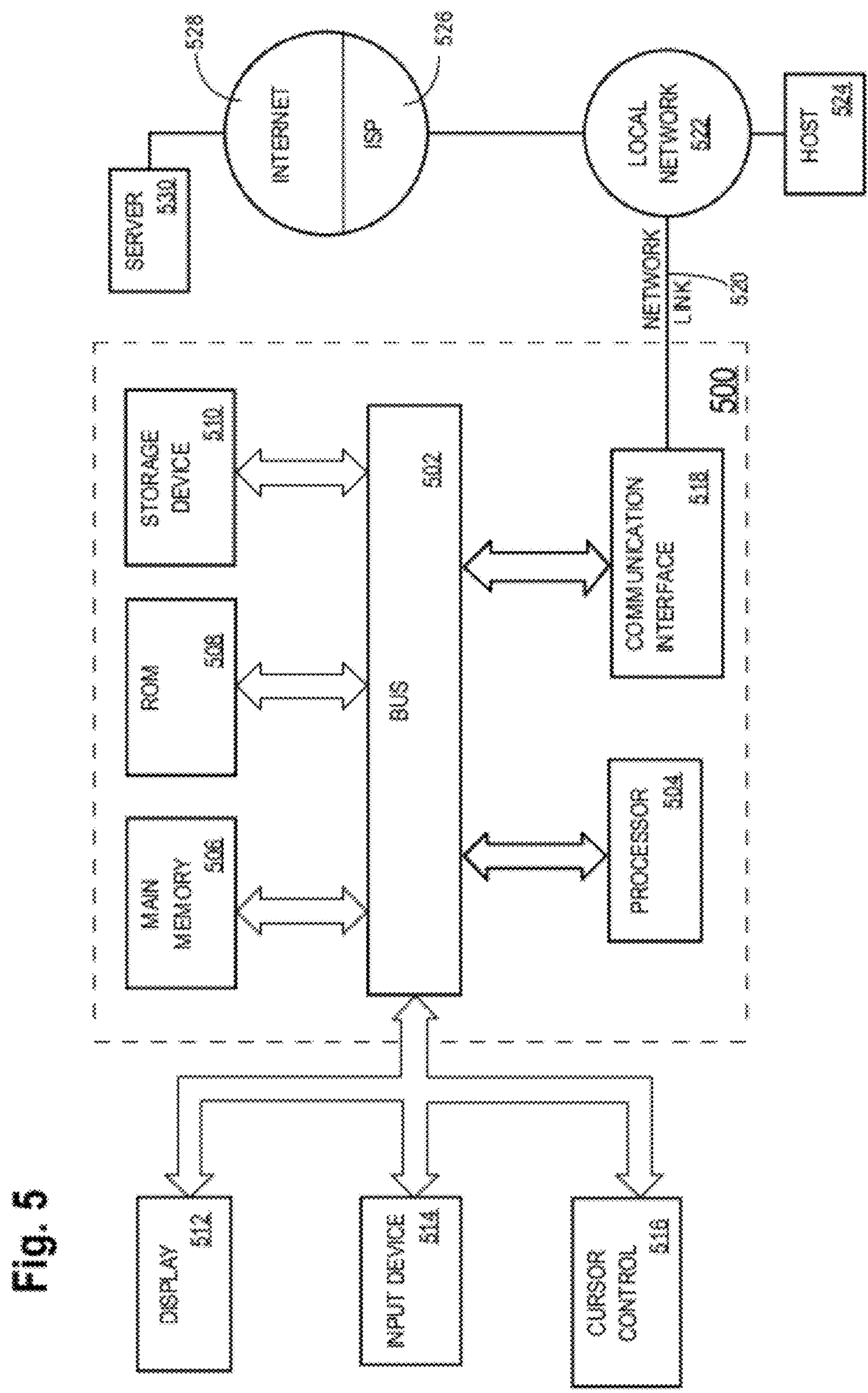
FIG. 5 illustrates an example hardware platform on which a computer or a computing device as described herein may be implemented, according a possible embodiment of the present invention.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a liquid crystal display, for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

11. Equivalents, Extensions, Alternatives and Miscellaneous

In the foregoing specification, possible embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

For the purpose of illustrations only, it has been described that in some possible embodiments, two images with different exposure may be used to create an HDR image. It should be noted that other numbers of images may be used to create an HDR image. In some possible embodiments, a single exposure is sufficient to create an HDR image. For example, a missing primary color for the image with the single exposure may be predicted or estimated. In some possible embodiments, more than two (2) exposures may be used to create an HDR image. In addition, numbers of exposures to be used in creating an HDR image may vary with specific pixels. On some pixels, only one exposure may be used, while on some other pixels two or more exposures may be used. When more than two exposures are used to create pixels for the HDR image, the selection of pixels from which exposure may depend on the values of the pixels. If a pixel in a longer exposure is beyond a range, e.g., covered by the longer exposure, a pixel from a shorter exposure may be used to estimate, interpolate or predict an appropriate pixel value in the HDR image. For example, the pixel in the shorter exposure may be scaled up in magnitude by a factor as determined by relative exposure times associated with the different exposures.

Under techniques herein, images with short and long exposures may be combined or used to generate an HDR. If a long exposure image is not clipped, then pixels in the long exposure image may be used to generate corresponding pixels in the HDR without using shorter exposures.

On the other hand, if pixels in the long exposure image are clipped, then pixels in a short exposure image may be used to estimate, predict, or interpolate corresponding pixels in the HDR.

It should be noted that for the purpose of the present invention, the roles described for long and short exposures may be reversed. For example, instead of using short exposures to predict pixel values in a long exposure, long exposures may be used to predict pixel values in a short exposure for the purpose of creating an HDR image.

What is claimed is:

1. A method comprising:

generating first measurable imagery responses of a scene, the first measurable imagery responses being obtained by exposing a first field of a multi-field image sensor of an image processing system for a first time duration;

generating second measurable imagery responses of the scene, the second measurable imagery responses at least in part being obtained by exposing a second field of the multi-field image sensor of the image processing system for a second time duration that contains the first time duration;

wherein the second measurable imagery responses further comprise measurable imagery responses in the first field for a time duration equal to a difference between the first time duration and the second time duration;

generating, based on the first measurable imagery responses only, a first image of the scene;

generating, based on both (1) the first measurable imagery responses and (2) the second measurable imagery responses, a second image of the scene;

combining the first image and the second image into an output image of the scene, the output image having a higher dynamic range than either of the first image and the second image.

2. The method of claim 1, wherein the first field and the second field are interleaved.

3. The method of claim 1, wherein the image processing system is configured with a color space, and wherein the first measurable imagery responses comprises responses for one or more component colors that are fewer than a full complement of component colors in the color space.

4. The method of claim 1, further comprising generating third measurable imagery responses of the scene, the third measurable imagery responses at least in part being obtained by exposing a third field of the multi-field image sensor of the image processing system for a third time duration that contains the second time duration; converting the first measurable imagery responses, the second measurable imagery responses and the third measurable imagery responses into the output image.

5. The method of claim 4, wherein the image processing system is configured with a color space, and wherein a full complement of component colors in the color space comprises component colors from the first measurable imagery responses and the second measurable imagery responses.

6. The method of claim 1, wherein the first image having a full complement of component colors in a color space;

wherein the second image having the full complement of component colors in the color space.

7. The method of claim 1, wherein one or more pixels values for at least one component color in the first image are predicted.

8. The method of claim 1, wherein one or more pixel values for at least one component color in the first image are predicted with one or more histograms.

9. The method of claim 1, wherein one or more pixel values for at least one component color in the first image are predicted with one or more histograms at least one of which is derived in part from one or more of the first measurable imagery responses and the second measurable imagery responses.

10. The method of claim 1, wherein one or more pixel values for at least one component color in the first image are predicted with one or more histograms at least one of which is derived from neither the first measurable imagery responses nor the second measurable imagery responses.

11. The method of claim 10, wherein the at least one of the one or more histograms is derived in part from an image in an image collection.

12. The method of 1, wherein one or more pixel values for at least one component color in the first image is predicted with a black-body radiation spectrum.

13. An apparatus comprising:

a processor;

where the processor is configured to perform:

generating first measurable imagery responses of a scene, the first measurable imagery responses being obtained by exposing a first field of a multi-field image sensor of an image processing system for a first time duration;

generating second measurable imagery responses of the scene, the second measurable imagery responses at least in part being obtained by exposing a second field of the multi-field image sensor of the image processing system for a second time duration that contains the first time duration;

wherein the second measurable imagery responses further comprise measurable imagery responses in the first field for a time duration equal to a difference between the first time duration and the second time duration;

generating, based on the first measurable imagery responses only, a first image of the scene;

generating, based on both (1) the first measurable imagery responses and (2) the second measurable imagery responses, a second image of the scene;

combining the first image and the second image into an output image of the scene, the output image having a higher dynamic range than either of the first image and the second image.

14. The apparatus of claim 13, wherein the first field and the second field are interleaved.

15. The apparatus of claim 13, wherein the image processing system is configured with a color space, and wherein the first measurable imagery responses comprises responses for one or more component colors that are fewer than a full complement of component colors in the color space.

16. The apparatus of claim 13, wherein the apparatus is further configured to perform:

generating third measurable imagery responses of the scene, the third measurable imagery responses at least in part being obtained by exposing a third field of the multi-field image sensor of the image processing system for a third time duration that contains the second time duration;

converting the first measurable imagery responses, the second measurable imagery responses and the third measurable imagery responses into the output image.

17. The apparatus of claim 16, wherein the image processing system is configured with a color space, and wherein a full complement of component colors in the color space comprises component colors from the first measurable imagery responses and the second measurable imagery responses.

18. The apparatus of claim 13, wherein the first image having a full complement of component colors in a color space; wherein the second image having the full complement of component colors in the color space.

19. The apparatus of claim 13, wherein one or more pixels values for at least one component color in the first image are predicted.

20. The apparatus of claim 13, wherein one or more pixel values for at least one component color in the first image are predicted with one or more histograms.

21. The apparatus of claim 13, wherein one or more pixel values for at least one component color in the first image are predicted with one or more histograms at least one of which is derived in part from one or more of the first measurable imagery responses and the second measurable imagery responses.

22. The apparatus of claim 13, wherein one or more pixel values for at least one component color in the first image are predicted with one or more histograms at least one of which is derived from neither the first measurable imagery responses nor the second measurable imagery responses.

23. The apparatus of claim 22, wherein the at least one of the one or more histograms is derived in part from an image in an image collection.

24. The apparatus of claim 13, wherein one or more pixel values for at least one component color in the first image is predicted with a black-body radiation spectrum.

25. A non-transitory computer readable storage medium, comprising software instructions, which when executed by a processor cause to perform:

generating first measurable imagery responses of a scene, the first measurable imagery responses being obtained by exposing a first field of a multi-field image sensor of an image processing system for a first time duration;

generating second measurable imagery responses of the scene, the second measurable imagery responses at least in part being obtained by exposing a second field of the multi-field image sensor of the image processing system for a second time duration that contains the first time duration;

wherein the second measurable imagery responses further comprise measurable imagery responses in the first field for a time duration equal to a difference between the first time duration and the second time duration;

generating, based on the first measurable imagery responses only, a first image of the scene;

generating, based on both (1) the first measurable imagery responses and (2) the second measurable imagery responses, a second image of the scene;

combining the first image and the second image into an output image of the scene, the output image having a higher dynamic range than either of the first image and the second image.

* * * * *